Feb. 5, 1924. 1,482,467
B. S. HARRINGTON
MEASURING AND FILLING MACHINE
Filed Oct. 28, 1920 5 Sheets-Sheet 5

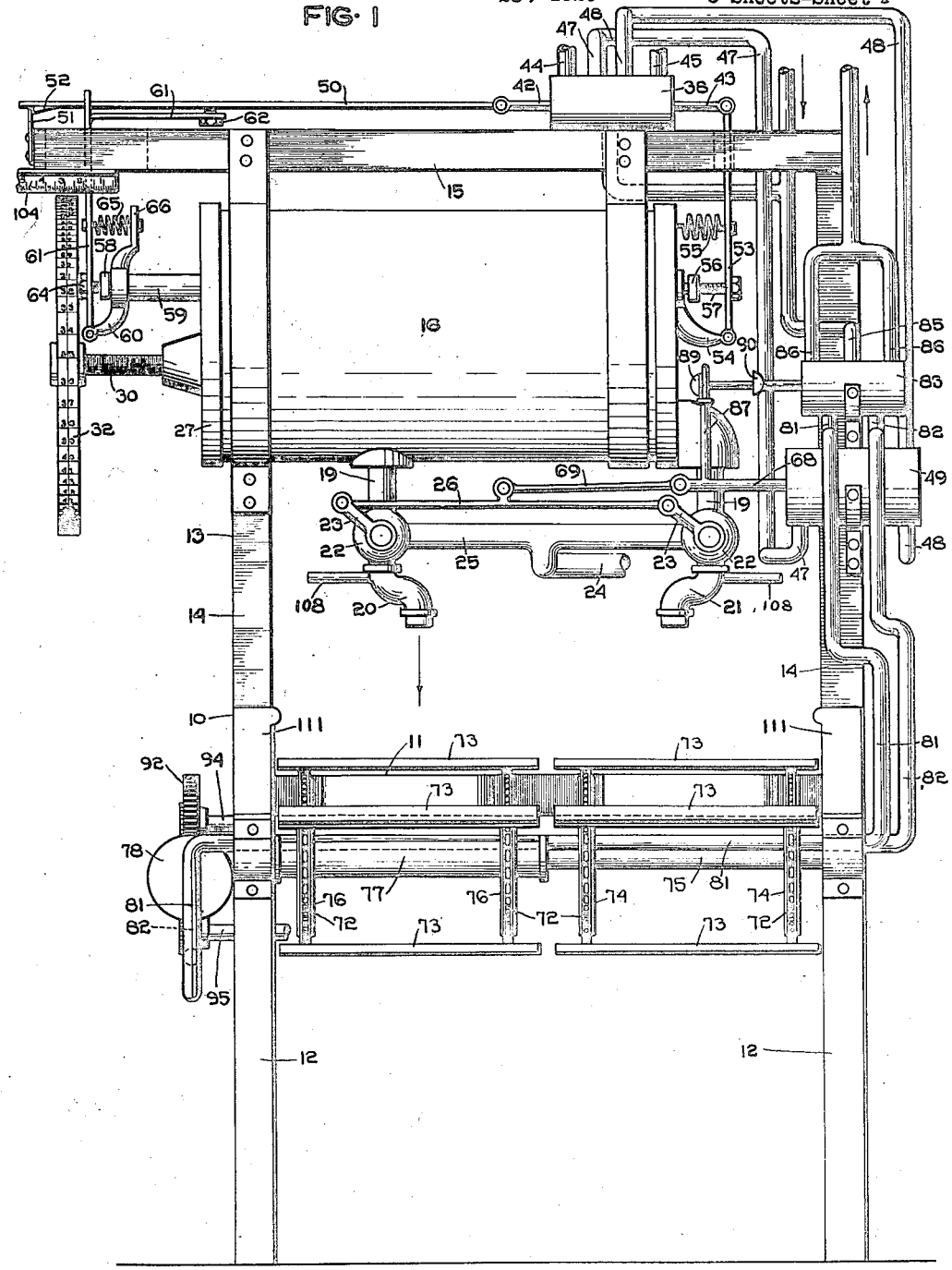

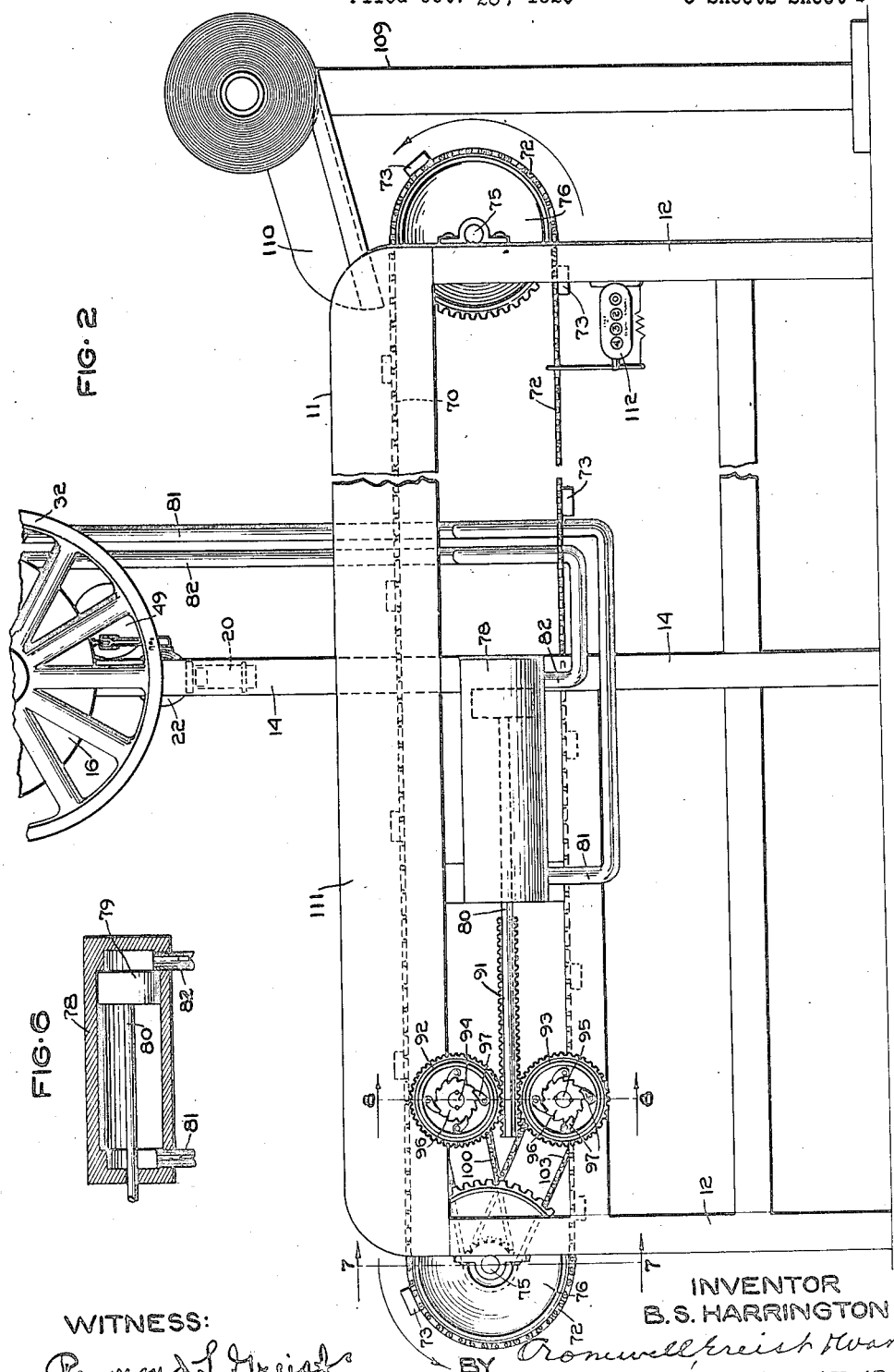

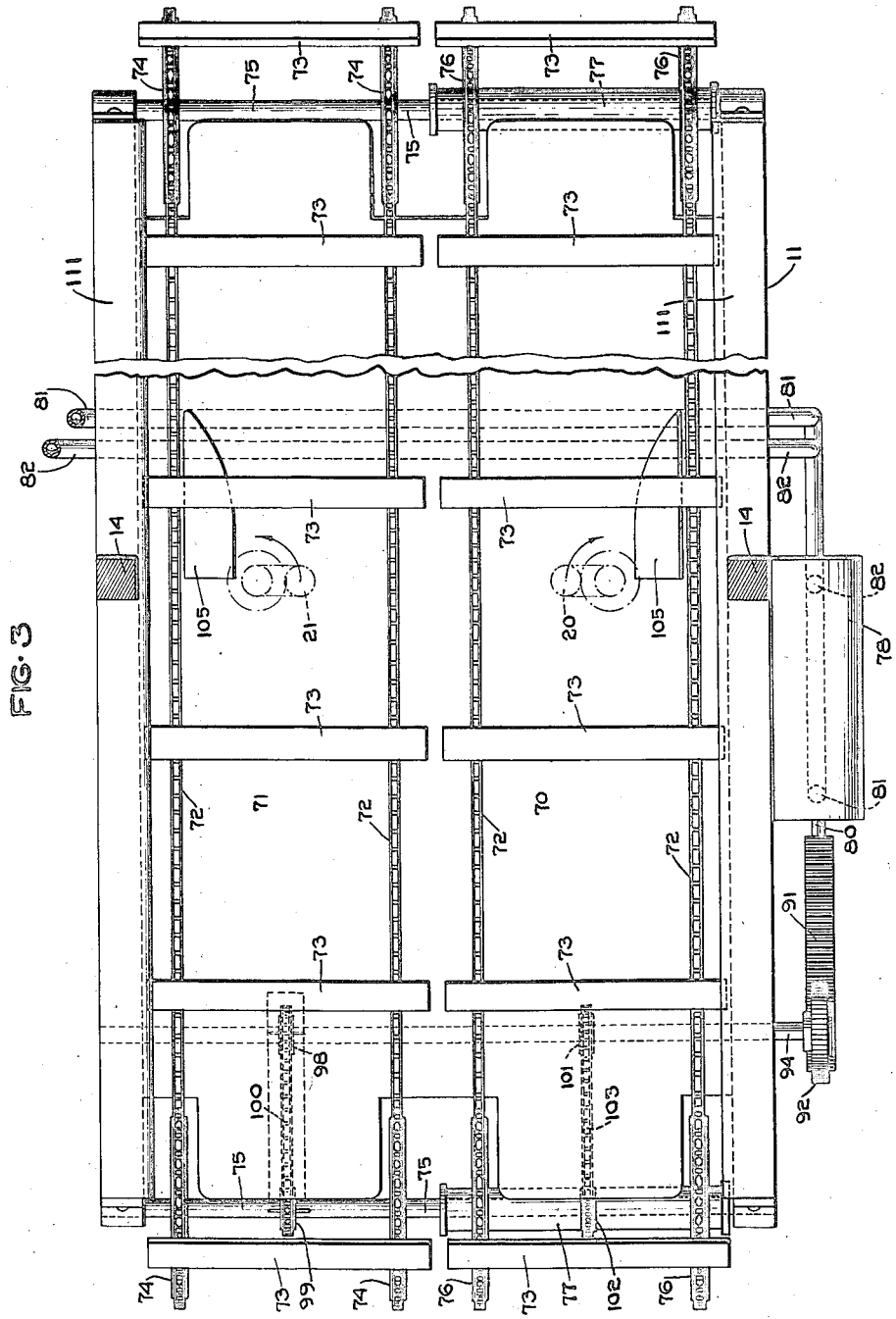

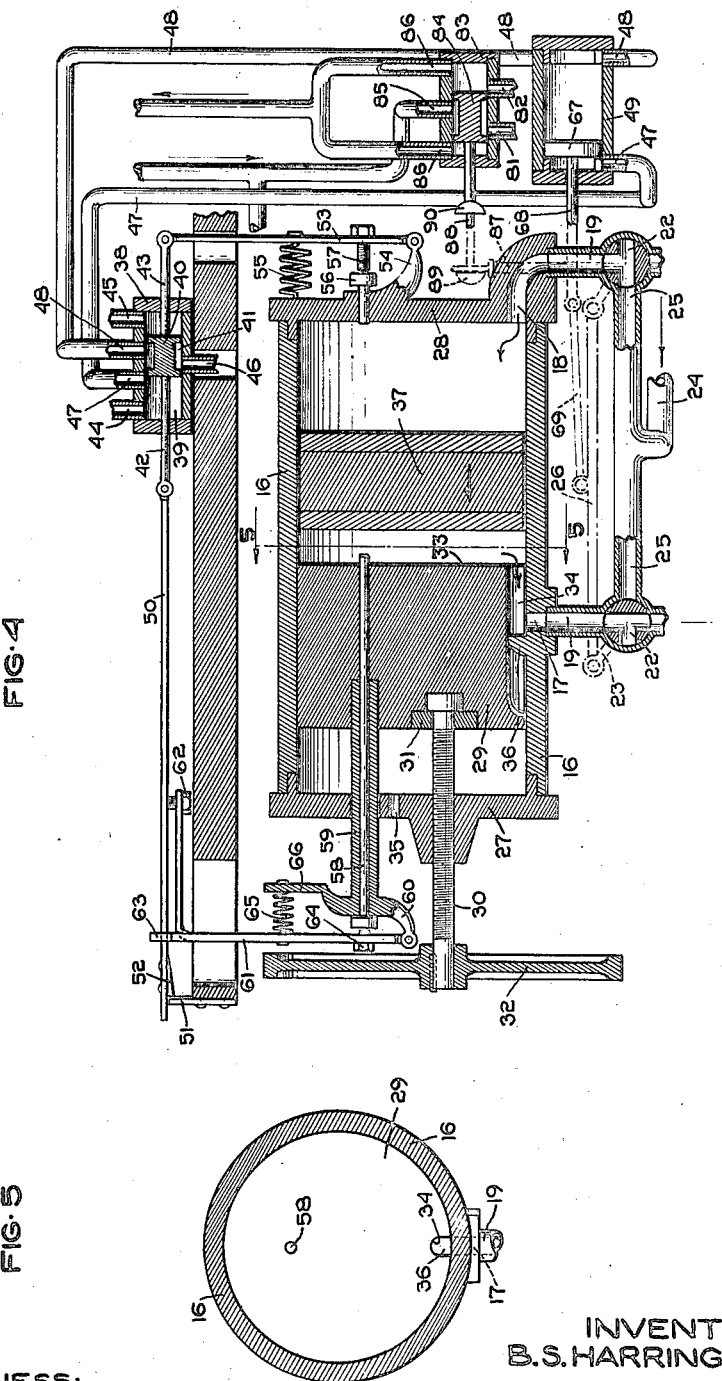

WITNESS: INVENTOR
B. S. HARRINGTON

Patented Feb. 5, 1924.

1,482,467

UNITED STATES PATENT OFFICE.

BERTIE SHEFFIELD HARRINGTON, OF FORT WORTH, TEXAS.

MEASURING AND FILLING MACHINE.

Application filed October 28, 1920. Serial No. 420,187.

*To all whom it may concern:*

Be it known that I, BERTIE S. HARRINGTON, a citizen of the United States, residing at Fort Worth, in the county of Tarrant and State of Texas, have invented certain new and useful Improvements in Measuring and Filling Machines, of which the following is a specification.

This invention relates to dispensing mechanism, and is particularly concerned with a measuring, filling and receptacle-handling machine adapted for use with substances in a fluid or semi-fluid state, such as oils, lard and the like.

The primary features of the present invention reside in the provision of a highly efficient machine of the type above mentioned which is entirely automatic in its operation and in its synchronism of coordinating mechanisms, which is continuous rather than intermittent in its action, and which is provided with means whereby the unitary equal quantities of substance being dispensed may be either greatly or minutely varied without stopping or in any way interfering with the operation of the machine. The particular measuring and dispensing mechanism incorporated in the machine herein disclosed forms the subject matter of my copending divisional application Serial Number 594,236, filed October 13, 1922, and patented August 14, 1923 under No. 1,464,676.

Numerous other objects and advantages, which are contemplated in the employment of this machine, will appear as the nature of the invention is better understood from the following disclosure thereof.

While the construction here shown and described in detail represents a preferred embodiment of the underlying principles of the invention, the design, construction and arrangement of the various parts contributing to make up the machine are to a large extent conventional, and are shown thus primarily for purposes of illustration. It should, therefore, be understood that the details of construction may be varied without departing from the scope of the invention as set forth in the appended claims.

In the drawings, upon which the following detailed description is based:

Fig. 1 is an end elevation of the machine;

Fig. 2 is a side elevation, with the upper portion of the supporting frame and mechanism carried thereon broken away;

Fig. 3 is a top plan view, with the upper portion of the supporting frame and mechanism carried thereon removed;

Fig. 4 is a vertical, longitudinal section through the measuring mechanism and adjacent machine controlling devices;

Fig. 5 is a vertical transverse section taken on the line 5—5 of Fig. 4;

Fig. 6 is a vertical longitudinal section through the air cylinder which operates the receptacle conveyors;

Figure 7:
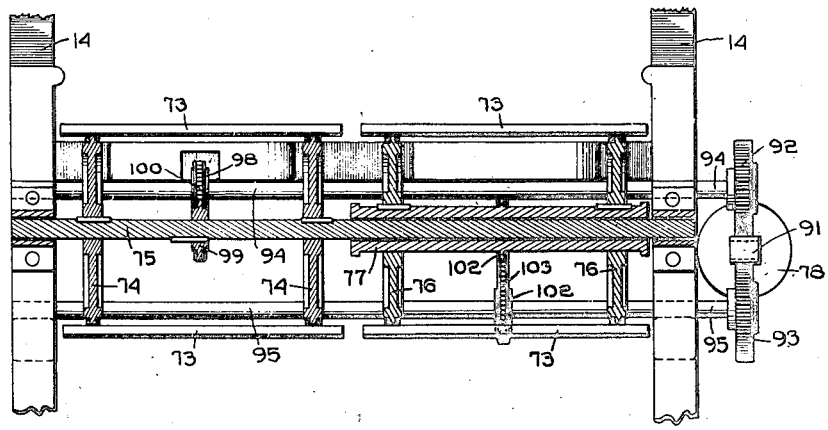
Fig. 7 is a vertical transverse section taken on the line 7—7 of Fig. 2.
Figure 8:
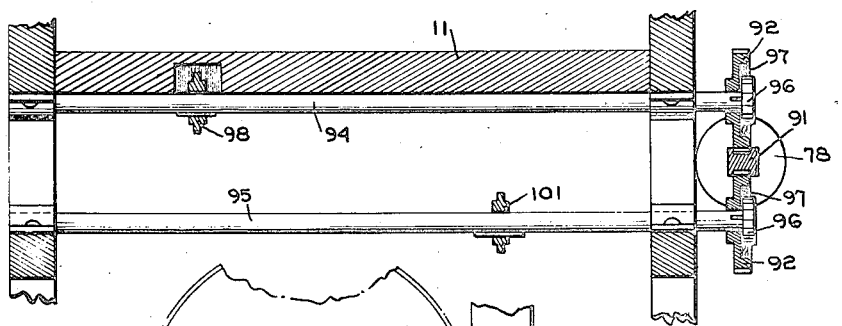
Fig. 8 is a similar section taken on the line 8—8 of Fig. 2.

Having detailed reference to the accompanying drawing, and particularly to Figs. 1, 2 and 4 thereof, the numeral 10 designates the frame which supports the mechanism of the machine. This frame is composed of an elongated table portion 11 which is provided at its four corners with vertical legs 12, and a yoke portion 13 which is positioned above the table 11 and is formed of two vertical beams 14 which extend upwardly from either side of said table portion intermediate its ends, and which are connected at their upper extremities by a cross-beam 15.

The measuring mechanism, together with the controlling and actuating means forming a part of the machine, are rigidly supported by the above mentioned yoke portion 13 of the frame, while the receptacle-handling mechanism and means for operating the same are carried respectively upon and under the aforesaid table portion 11.

The so-called measuring mechanism consists primarily of a relatively large cylinder 16, most clearly shown in Fig. 4, which is provided in its bottom with two spaced ports 17 and 18, which open downwardly to pipes 19 which terminate in swivelled offset discharge nozzles 20 and 21 respectively. Disposed in each pipe 19 intermediate its discharge nozzle and the cylinder 16, is a three-way valve 22 which is rotatable on its horizontal axis by means of a short arm 23 fixedly secured to the valve stem.

A pipe 24 for supplying the fluid to be dispensed opens into a horizontal pipe 25 which terminates at either end in the casing of that one of the three-way valves 22 adjacent thereto; and each of said valves is so designed that by operation thereof through movement of the levers 23 the ports 17 and 18 are alternatively put into open communication with the liquid supply and with the discharge nozzle. The upper ends of the levers 23 are connected by a horizontal link 26 in such a way that when port 17 is in communication with its discharge nozzle, port 18 is in communication with the liquid supplying pipe 24, and vice versa. This is illustrated clearly in Fig. 4.

Port 17 opens into cylinder 16 a spaced distance from one end 27 thereof, while port 18 opens into said cylinder at its opposite end 28. A false head 29 fits snugly in cylinder 16 above the port 17, and is adapted to be adjusted longitudinally in the bore of the same a limited distance in either direction. The means for adjusting said false head comprises a screw spindle 30 which is attached to one end of the false head and, although prevented from moving longitudinally with relation thereto, is permitted to rotate within the confines of its attaching plate 31. Spindle 30 projects horizontally through cylinder head 27, and is in threaded engagement with the same. A hand wheel 32 is keyed to the outer extremity of spindle 30, and upon rotation of said wheel the false head 29 may be made to move inwardly or outwardly in cylinder 16, thus varying the effective volume of said cylinder between the inner end 33 of the false adjustable head and the opposite fixed cylinder head proper.

A passage 34 is provided in the under side of the false head above the port 17 and extends from the inner end of said head to a point a little short of the length of the same. The port 17 is therefore at all times in communication with the interior of cylinder 16 regardless of the position in which the false head may be adjusted.

That portion of the interior of cylinder 16 between the false head 29 and the fixed cylinder head 27 is functionless, and a small aperture 35 may be bored in said cylinder end to relieve any vacuum or pressure set up therein by reason of the movement of the false head. The movement of the false head 29 is limited in an outward direction by contact of the same with cylinder head 27 and in an inward direction by contact of the end of passage 34 with a projecting and passage-filling lug 36 formed in the bottom of cylinder 16 adjacent port 17.

A floating piston 37 also fits snugly within the bore of cylinder 16 and reciprocates therein between the face 33 of the false head and the opposite fixed head 28 of said cylinder. The means for actuating said floating piston consists of the fluid being dispensed, which must be under pressure.

With the three-way valves in the position illustrated in Fig. 4, fluid under pressure will float from the supply pipe 24 into the right end of cylinder 16 through port 18, forcing the piston to the left and causing the fluid occupying the cylinder on the opposite side of said piston to be expelled therefrom through the port 17 and its adjacent three-way valve and discharge nozzle. Upon coming in contact with the false head the movement of the piston is stopped and the flow from the left hand discharge nozzle ceases.

It will readily be seen that if the positions of the three-way valves 22 are now changed by rotating the same simultaneously 90° in a clockwise direction by means of the lever-connecting link 26, an equal quantity of fluid, which has meanwhile filled the right-hand end of cylinder 16 in the process of moving the piston to the left, will now be discharged therefrom through port 18 and its corresponding three-way valve and discharge nozzle.

A description of the means for automatically operating the three-way valves each time the free piston reaches either end of its travel, follows:

Mounted advantageously on the cross-beam 15 above the cylinder 16 is a small cylindrical valve casing 38 having a central bore 39 wherein is disposed a reciprocating valve plug 40 which is provided about its circumference with a relatively wide annular groove 41. Said valve plug is attached at both ends to axially alined stems 42, 43 which project through the ends of the valve casing and extend a short distance therebeyond.

Five ports 44 to 48 inclusive, with similarly numbered pipes are in communication with the bore 39 of the valve. The end ports 44 and 45 are exhaust air ports or vents, the lower center port 46 is a compressed air inlet, and the upper medial ports 47 and 48 communicate respectively with the left and right hand ends of an air motor 49, to be later described, which is positioned advantageously below and to the right of cylinder 16 on one of the vertical frame beams 14 previously metnioned.

The stem 42 of the valve 40 has pivoted thereto at its outer extremity one end of a flat, horizontal bar 50, the opposite end of which bar rests upon the knife-like edge of a small vertical support 51 securely attached to the end of cross-beam 15. A small wedge-shaped catch 52 is secured to the under surface of bar 50 adjacent the support 51 and, when the valve 40 has assumed the position shown in Fig. 4, the outer or abrupt face of said catch abuts the edge of support 51 and prevents movement of valve 40 to the left unless said catch is released from engagement with support 51 by raising bar 50 a sufficient distance to permit the catch to pass freely thereover.

The stem 43 of valve 40 has pivoted thereto at its outer extremity the upper end of a vertically disposed rod 53. The lower end of said bar is pivoted to a bracket arm 54 extending outwardly a short distance from the cylinder head 28. A relatively strong spring 55 connects the medial portion of rod 53 with the adjacent end of cylinder 16 and, using the bracket arm 54 as a fulcrum, tends to shift valve 41 to the left. Valve 40 is held stationary however, due to the engagement of catch 52 with the edge of support 51.

A short distance above the bracket arm 54 in the cylinder head 28 is a reciprocating plunger or tappet 56 which extends a short distance inside of cylinder 16 and is provided on its outer end with an enlarged head. An adjusting screw 57 is positioned in rod 53 in axial alinement with said plunger and retains the same in its inward position when valve 40 has shifted to the left hand end of its throw. When said valve is in the position illustrated in the drawings however, the rod 53, acting through the adjusting screw 57, limits the outward movement of the tappet, as shown.

A second but elongated plunger or tappet 58 is positioned in the false head 29 in horizontal alinement with tappet 56. The inner extremity of tappet 58 likewise extends into the interior of cylinder 16 a short distance. An elongated support 59 is fixedly secured to the outer face of the false head 29, and extends outwardly through the cylinder end 27 to a point short of the hand wheel 32 where it is formed into a bracket arm 60. This support receives and supports throughout its length the elongated shank of the reciprocating tappet plunger 58.

A rod 61 is pivoted at its lower extremity to the bracket arm 60 and extends vertically to a point immediately below the previously described bar 50, at which point the rod 61 turns horizontally and extends a short distance to the right parallel to the bar 50. This end of rod 61 contains an adjusting screw 62 which will contact with the under surface of bar 50. At the point at which rod 61 turns horizontally to the right, two short vertically extending fingers 63 are formed which extend on each side of the bar 50 to prevent lateral movement thereof and to vertically aline the same with the point of the adjusting screw 62.

The rod 61 contains another adjusting screw 64 which is axially alined with tappet 58 and contacts with the enlarged head thereof. A spring 65 connects the medial portion of rod 61 with an extension 66 of the bracket arm 60 and serves to retain the tappet 58 in its inward position and to prevent the adjusting screw 62 of bar 61 from tripping bar 50 upwardly unless the same is intentionally so actuated through the outward movement of said tappet.

It will now be seen that the floating piston 37, upon moving into contact with the end 28 of cylinder 16, will move tappet 56 outwardly and thus shift the valve 40 to the right against the action of spring 55. Upon being so shifted valve 41 is held against shifting to the left by the operation of catch 52 previously described. Upon contacting with the inner end 33 of the false head 29, the piston will move tappet 58 outwardly and will thus cause rod 61 to trip bar 50 upwardly, whereupon the valve 40 will be shifted to the left by the action of the expanded spring 55.

Due to the novel construction and arrangement of parts as above set forth, the valve 40 shifts its position each time the piston contacts with the head and tappet at either end of its stroke, regardless of the position to which the false head is adjusted.

Since it is desired that the three-way valves 22 be operated each time the piston reaches either end of its stroke in order that the ports 17 and 18 will be caused to reverse their functions as inlet and discharge ports and thus permit the measuring and discharging operations to be carried on in the reverse direction, the previously mentioned air motor 49, actuated by valve 40, is employed.

When the piston is moving to the left, as shown in Fig. 4, valve 40 is in its right hand position in casing 38, and the wide annular groove 41 thereof transmits compressed air or other pressure fluid from port 46 to port 48 and thus into the right hand end of air motor 49. A piston 67 reciprocates therein and has its stem 68 connected by a link 69 to the link 26 which rotates valves 22 simultaneously. Due to the force of the compressed air the piston 67 is held at the left hand end of its stroke, the air having been expelled from that end of cylinder 49 through pipe 47 into the bore 39 of valve casing 38 from where it escapes through the exhaust port 44.

As the floating piston 37 reaches the left hand end of its stroke, it pushes outwardly the plunger tappet 58 and the valve 40 immediately is shifted to the left. Pipe 47 leading therefrom now becomes an inlet to air motor 49, and pipe 48, which was previously the inlet to said air motor, now becomes the compressed air exhaust and, as a result, piston 67 in cylinder 49 is forced to the right, causing the three-way valves 22 to rotate and reverse the action of the measuring chamber. It will readily be perceived that the machine automatically will continue functioning and reversing indefinitely in cycle.

The description of the means synchronized with the measuring mechanism hereinabove described for placing receptacles under the discharge nozzles 20 and 21 and removing said receptacles at the proper time when filled, follows:

Referring more particularly to Figs. 2 and 3, and 6 to 8 inclusive, the numerals 70 and 71 indicate in general two parallel endless receptacle conveyors positioned lengthwise along the surface of the table portion 11 and passing respectively under the discharge nozzles 20 and 21. Each conveyor consists of two parallel chains 72 connected at regular spaced intervals by transverse slats 73.

The conveyor 71 is carried upon sprocket wheels 74 which are keyed to a shaft 75 located at each end of the table portion 11.

The conveyor 70 is similar to conveyor 71 with the exception that its sprocket wheels 76 at each end thereof are keyed to a sleeve 77 which is mounted on shaft 75 and concentric therewith, but which is, however, free to rotate independently thereof.

The conveyors travel to the left, as viewed in Figs. 2 and 3, along the surface of the table portion 11. The movement of each is intermittent and each step is equivalent to the distance between two adjacent slats 73. The coveyors move in alternation, first one and then the other, the movement of each being so timed that it will take place immediately after the discharge from the nozzle thereabove has ceased, thus removing the filled receptacle and placing an empty receptacle carried by the succeding slat in position to be filled when that nozzle again discharges a quantity of the fluid being dispensed.

In order to transmit such an intermittent motion to each of the conveyors and to synchronize the motion with the functioning of the measuring mechanism thereabove, an air motor 78 is provided which is rigidly attached to the side of the frame. This motor is similar in many respects to the air motor 49 which operates the three-way valves 22, and is provided with a piston 79, piston rod 80, and ports 81 and 82 with their connecting pipes leading thereto. Said ports 81 and 82 each function alternately as inlets and exhausts for compressed air, and are positioned at opposite ends of the motor cylinder 78.

The pipes 81 and 82 connect their respective air ports with a small valve casing 83 which houses a five-port valve similar to valve casing 38, and is best shown in Fig. 4.

The valve plug 84, which is provided with a wide annular groove about its circumference, serves to put each of pipes 81 and 82 alternately in communication with a supply port 85 of compressed air and with an exhaust port or vent 86, said valve being so constructed that when pipe 81 is in communication with the air supply port 85, pipe 82 is in communication with one of the exhaust ports 86.

It, therefore, will be evident that upon longitudinal shifting of valve 84 in its cylinder, piston 79 will be forced to move from one end of its cylinder 78 to the other.

Valve 84 is operated by an arm 87 extending vertically from the piston rod 68 of air cylinder 49, and bifurcated to form a crotch through which the stem 88 of valve 84 passes. Abutments or enlarged portions 89 and 90 are spaced apart on said stem, and when the piston rod 68 moves longitudinally to rotate the three-way valve 22, the bifurcated extension 87 thereof contacts, when nearing the end of its throw, with one of the enlargments 89 or 90 on stem 88 and thus shifts valve 84 which controls the conveyor operating device.

Because of this limited free movement of arm 87 on the valve stem 88 all chance of moving the conveyor under the nozzle then discharging before the discharge has been cut off by three-way valve 22, is eliminated.

The piston 79 of cylinder 78 moves conveyors 70 and 71 in the manner following:

A double faced rack 91 is formed as an extension to the piston rod of air motor 78, and intermeshes above and below with pinions 92 and 93 which are free to rotate in a clockwise direction only on their respective transverse shafts 94 and 95.

Each of said pinions, when rotated in a contra-clockwise direction, causes its respective shaft to rotate therewith through the well known means of a ratchet 96 keyed to the shaft and a plurality of pawls 97 engaging the teeth of said ratchet. It readily will be seen that as the piston 79, carrying the rack 91 moves to the left the shaft 95 will be rotated in a contra-clockwise direction, and as the piston 79 moves to the right the shaft 94 will be likewise rotated.

The shaft 94 has a small sprocket wheel 98 keyed thereto near its far end, while the shaft 75 has a similar sprocket wheel 99 keyed thereto, and a chain 100 passes over and between said sprockets thus transmitting the rotary motion of shaft 94 to shaft 75.

Shafts 95 and sleeve 77 have similar sprocket wheels 101 and 102 keyed respectively thereto, and the rotary motion of shaft 95 is transmitted to sleeve 77 by means of a chain 103 connecting said sprockets.

The stroke of piston 79 and the size of the various pinions and sprocket wheels is so designed that one stroke of said piston suffices to move either one of the conveyors the length of the space between the conveyor slats 73.

The operation of this machine is as follows, assuming the various valves and cylinder pistons to be in the positions shown in Figs. 4 and 2, and that the floating piston 37 is moving to the left under the pressure of the fluid therebehind:

Having expelled all of the fluid from in front of it, the piston 37 pushes the tappet 58, and the three-way valves 22 are immediately reversed by means of the cylinder 49 as previously described. As the three-way valve at the left cuts off the discharge therethrough the valve 84 is shifted and the slatted conveyor 70 is caused to move forward, carrying away the filled receptacle from under nozzle 20 and placing an empty receptacle, carried in front of the succeeding slat, thereunder.

The piston 37 now moves to the right under the pressure of the fluid therebehind, and upon its pushing tappet 56, the three-way valves are again rotated in the manner and by the means previously described, and the slatted conveyor 71 moves forward carrying away the filled receptacle from under nozzle 21 and placing an empty one thereunder.

This cycle will repeat indefinitely and automatically as long as the supply of fluid under pressure is continued, and compressed air or other motor fluid is supplied. The operator is only required to place empty receptacles before the conveyor slats at one end of the conveyor and to remove the filled receptacles at the opposite end.

To increase or decrease the amount of material discharged into each receptacle, the operator need only rotate the hand wheel 32. This may be done either while the machine is in full operation or while it is inactive.

A scale 104 is provided above hand wheel 32, and the periphery of said wheel itself is subdivided to provide a micrometer in order that the minutest change may be made in the amount of substance being dispensed. This scale also indicates at what points the hand wheel 32 should be rotated to in order to measure out different amounts, such as 1, 2, 4 or 8 pound quantities of the substance.

In order to properly position the receptacles laterally in front of the slats 73, deflecting guides 105 are rigidly attached to the table portion near its sides and intermediate its ends. These guides are sufficiently low to clear the slats 73 passing thereover, but function to shift the passing receptacles a uniform distance from the outer sides of the conveyors into positions wherein the receptacles on each conveyor are tangential to a base line which extends lengthwise of the conveyor through the tip of the associated guide 105.

Figure 9:
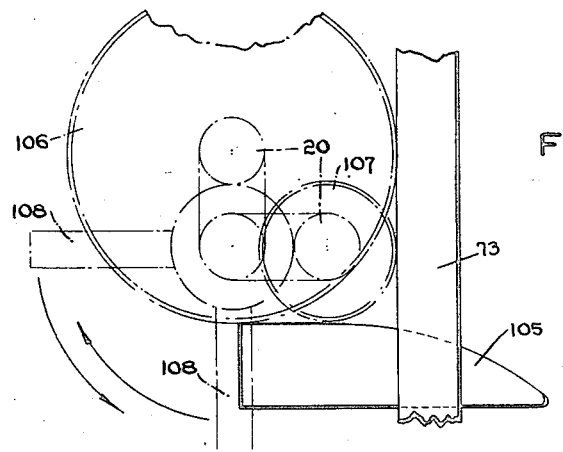
Fig. 9 is an enlarged plan view of the receptacle positioning means, also illustrating diagrammatically the means for positioning the discharge nozzles of the machine above receptacles of different size.

The discharge nozzles 20 and 21 are offset and swivelled to the lower portions of pipes 19 as previously mentioned for the purpose following: In order to approximately center said nozzles with large receptacles 106 passing thereunder, the nozzles are left in the positions shown, but when a small or medium sized receptacle 107 is being used, the nozzles 20 and 21 may be swung forwardly as diagrammatically shown in Fig. 9, until said nozzles approximately center with the centers of the smaller receptacles. Handles 108 may be provided on nozzles 20 and 21 in order to more easily adjust the positions of the same.

A vacuum-operated receptacle-lid remover 109 (Fig. 2) of an approved type may be employed advantageously with this machine, and should be positioned at the receiving end of the same with its lid discharge chute 110 arranged so that the lids will be deposited on the table portion in a substantially vertical position and will be carried forward with their corresponding receptacles by the travel of slats 73. The lids are deposited between the outer chains 72 of the conveyors and the sides of the table portion 11, said lids being maintained in a substantially upright position by means of longitudinally extending headed curbings 111 which form lateral vertical extensions to the table portion proper.

A counter 112 may be provided at any convenient point on the frame adjacent one of the conveyors, and if regulated to record in multiples of two, will automatically count the numbers of receptacles filled.

I claim:

1. In a measuring and dispensing apparatus, the combination with the alternately discharging nozzles of a measuring device, of means for positioning receptacles at the nozzles comprising a plurality of endless conveyors having longitudinally spaced receptacle-carrying portions, the conveyors arranged in parallelism and moving each before one of the nozzles, and means operatively coupled with mechanism of the measuring device to actuate the conveyors alternately to place a receptacle before the inactive nozzle, said means acting automatically in synchronism with the discharging nozzles of the measuring device.

2. In a measuring and dispensing apparatus, the combination with a measuring device including a pair of alternately discharging nozzles, of means for positioning receptacles at the nozzles comprising a pair of endless conveyors having longitudinally spaced receptacle-carrying portions and arranged in parallelism in a common plane to move each before one of the nozzles, the conveyors including at each end a shaft suitably journaled and having thereon at one side chain-carrying sprockets for one of the conveyors and at the other side a co-axial sleeve bearing chain-carrying sprockets for the other conveyor, a pair of counter shafts disposed in parallel planes and geared one to an end shaft and the other to an end sleeve, a double faced rack, a pair of pinions each enmeshed with one face of the rack and having a ratchet and pawl connection with one of the counter shafts, and means to reciprocate the rack in synchronism with the measuring device whereby to advance the conveyors alternately step by step to place a receptacle at one nozzle while the other is discharging.

3. In a measuring and dispensing apparatus, the combination with a measuring device including a pair of valved discharge nozzles, of means for positioning receptacles at the nozzles comprising a pair of endless conveyors arranged in parallelism and arranged each before one of the nozzles, and means to actuate the conveyors alternately in synchronism with the measuring device to place a receptacle before the inactive nozzle, said synchronously operating means comprising a fluid pressure operated motor for effecting the intermittent operation of the valves of the measuring device, a similar motor for effecting the intermittent alternate movement of the conveyors, motive fluid valves for the two motors coupled to operate in unison, and a connection between one of the valves and the measuring device whereby alternately to operate said valves as and when a measured quantity is available for discharge.

4. In a measuring and dispensing apparatus, the combination with a measuring device including a pair of alternately discharging nozzles, of means for positioning receptacles at the nozzles comprising a pair of endless conveyors having longitudinally spaced receptacle-carrying portions and arranged in parallelism in a common plane to move each before one of the nozzles, the conveyors including at each end a shaft suitably journaled and having thereon at one side chain-carrying sprockets for one of the conveyors and at the other side a co-axial sleeve bearing chain-carrying sprockets for the other conveyor, a pair of counter shafts disposed in parallel planes and geared one to an end shaft and the other to an end sleeve, a double faced rack, a pair of pinions each enmeshed with one face of the rack and having a ratchet and pawl connection with one of the counter shafts, and means to reciprocate the rack in synchronism with the measuring device whereby to advance the conveyors alternately step by step to place a receptacle at one nozzle while the other is discharging, a fluid pressure operated motor for effecting the intermittent alternate discharge from the nozzles of the measuring device, a similar motor for effecting the intermittent alternate movement of the conveyor, motive fluid valves for the two motors coupled to operate in unison, and a connection between one of the valves and the measuring device whereby alternately to operate said valves as and when a measured quantity is available for discharge.

In testimony whereof I have hereunto subscribed my name in the presence of two subscribing witneses.

BERTIE SHEFFIELD HARRINGTON.

Witnesses:
R. H. MOORMAN,
THEO. JOHNSON.